United States Patent
Cao et al.

(10) Patent No.: US 7,551,397 B2
(45) Date of Patent: Jun. 23, 2009

(54) MAGNETIC WRITE HEAD HAVING A FIRST MAGNETIC POLE WITH A SELF ALIGNED STEPPED NOTCH

(75) Inventors: Bin V. Cao, Fremont, CA (US); Hung-Chin Guthrie, Saratoga, CA (US); Wen-Chien Hsiao, San Jose, CA (US); Jyh-Shuey Lo, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 529 days.

(21) Appl. No.: 11/218,701

(22) Filed: Sep. 2, 2005

(65) Prior Publication Data

US 2007/0053102 A1    Mar. 8, 2007

(51) Int. Cl.
G11B 5/187    (2006.01)
(52) U.S. Cl. .............................. 360/125.46; 360/125.64
(58) Field of Classification Search ............ 360/125.46, 360/125.64, 125.19
See application file for complete search history.

(56) References Cited

U.S. PATENT DOCUMENTS

| 5,804,085 | A | 9/1998 | Wu et al. ................. 216/22 |
| 6,072,672 | A | 6/2000 | Westwood ................. 360/126 |
| 6,141,183 | A | 10/2000 | Wu et al. ................. 360/126 |
| 6,141,857 | A | 11/2000 | Furusawa et al. ............. 29/603 |
| 6,243,939 | B1 | 6/2001 | Chen et al. ............... 29/603.14 |
| 6,261,468 | B1 | 7/2001 | Sato et al. ..................... 216/22 |
| 6,339,872 | B1 | 1/2002 | Chang et al. ............. 29/603.14 |
| 6,393,692 | B1 | 5/2002 | Ju et al. .................... 29/603.14 |
| 6,477,007 | B1 | 11/2002 | Shukh et al. ................ 360/126 |
| 6,504,677 | B1 | 1/2003 | Han et al. ................... 360/126 |
| 6,510,024 | B2 | 1/2003 | Otsuka et al. ............... 360/126 |
| 6,515,824 | B1 | 2/2003 | Sato ............................ 360/126 |
| 6,525,905 | B1 * | 2/2003 | Sasaki .................... 360/125.42 |
| 6,526,649 | B2 | 3/2003 | Ohkawara ................ 29/603.07 |
| 6,553,649 | B1 | 4/2003 | Santini ..................... 29/603.14 |
| 6,557,242 | B1 | 5/2003 | Santini ..................... 29/603.14 |
| 6,621,659 | B1 | 9/2003 | Shukh et al. ................ 360/126 |
| 6,642,148 | B1 | 11/2003 | Ghandehari et al. ......... 438/694 |
| 6,738,232 | B1 | 5/2004 | Sasaki ........................ 360/317 |
| 6,741,422 | B2 | 5/2004 | Hsiao et al. ................. 360/126 |
| 6,743,712 | B2 | 6/2004 | Park et al. .................... 438/637 |
| 6,751,052 | B1 * | 6/2004 | Tagawa et al. ......... 360/125.44 |
| 6,937,436 | B2 * | 8/2005 | Sasaki ................... 360/125.42 |
| 6,947,255 | B2 * | 9/2005 | Hsiao et al. ............ 360/125.51 |
| 6,987,643 | B1 * | 1/2006 | Seagle .................... 360/125.42 |
| 7,002,777 | B2 * | 2/2006 | Ogawa et al. .......... 360/125.46 |

(Continued)

Primary Examiner—Jefferson Evans
(74) Attorney, Agent, or Firm—Zilka-Kotab, PC

(57) ABSTRACT

A magnetic write head and method of manufacture thereof that has a first pole structure having a step notched first pole structure. The step notched structure includes a bottom notched portion that is wider than the second notched portion formed thereover. The upper, or narrower, notched portion has a width that is substantially equal to and self aligned with a second pole structure (P2) formed thereover. The invention may also include first and second wing portions formed in the first pole that are recessed from the ABS and that extend laterally from the first notched portions of the first pole. The formation of the winged portions is assisted by an ion mill resistant bump (alumina bump) formed thereover, which acts as a mask during the ion milling operations that are used to form the first and second notches.

8 Claims, 14 Drawing Sheets

U.S. PATENT DOCUMENTS

| | | | |
|---|---|---|---|
| 7,124,498 B2 * | 10/2006 | Sato .......................... 29/603.13 |
| 2002/0178573 A1 | 12/2002 | Oike et al. ................ 29/603.15 |
| 2003/0021064 A1 * | 1/2003 | Ohtomo et al. ............. 360/126 |
| 2003/0112554 A1 * | 6/2003 | Daby et al. ................. 360/125 |
| 2004/0184190 A1 * | 9/2004 | Han et al. ................... 360/126 |
| 2005/0243466 A1 * | 11/2005 | Kameda et al. ............. 360/126 |
| 2006/0010684 A1 * | 1/2006 | Lee et al. ................. 29/603.15 |
| 2007/0058293 A1 * | 3/2007 | Bedell et al. ................ 360/126 |
| 2008/0074782 A1 * | 3/2008 | Guthrie et al. .............. 360/110 |

* cited by examiner

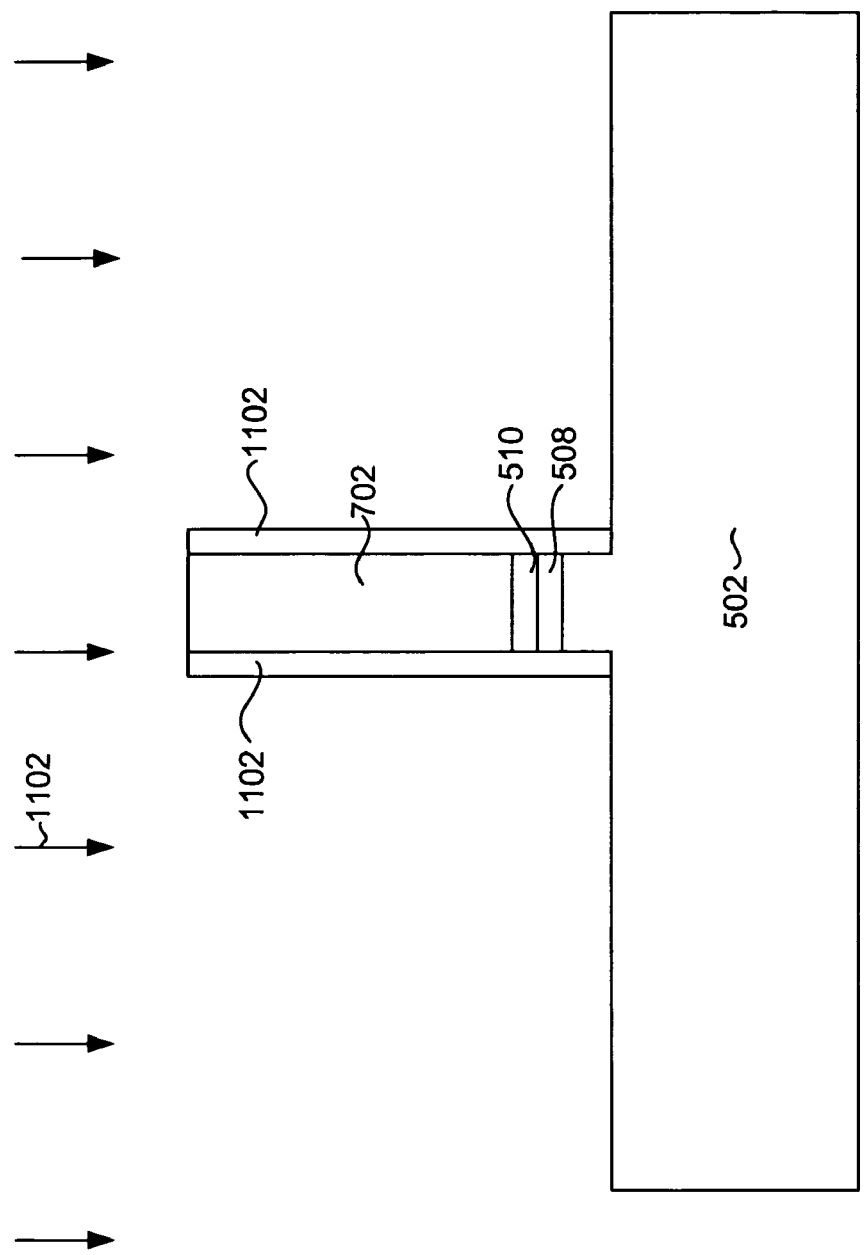

MAGNETIC WRITE HEAD HAVING A FIRST MAGNETIC POLE WITH A SELF ALIGNED STEPPED NOTCH

FIELD OF THE INVENTION

The present invention relates to magnetic write heads for magnetic data recording, and more particularly to a magnetic write head having a narrow P2 write pole that is self aligned with a P1 write pole having a steep shoulder for reduced flux leakage.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but is free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

The magnetic signals are written to the magnetic medium by a write head that includes an electrically conductive write coil that passes between first and second poles. The poles are joined at a back gap region and separated from one another by a write gap in a pole tip region near the ABS. When a current passes through the coil, a resulting magnetic flux in the magnetic yoke generated a fringing magnetic field that extends between the pole tips fringes out to write a magnetic signal onto an adjacent magnetic medium.

The configuration of the magnetic poles in the pole tip region of the write head is very important to the magnetic performance. For example, the pole tips must have sufficient area to avoid choking off the flow of magnetic flux to the pole tip or saturating the pole tips. Also, since the width of the pole tips defines the track width of the write head, at least one of the poles must have a width that is sufficiently narrow to define a desired narrow track width. A smaller track width means that more tracks of data can be written onto a given amount of disk space. The write element should also be constructed to prevent undesired, stray magnetic fields, such as those that can contribute to adjacent track writing. For example, fields that extend laterally from the sides of the pole tips rather than straight from one pole to the other can result in a signal being bleeding to an adjacent track and can interfere with the signal of that adjacent track.

However, constructing a write head to have these desired characteristics has been limited by currently available manufacturing methods. For example, the resolution limitations of currently available photolithographic processes, and the ability to align multiple photolithographically defined mask structures limits the amount to which the track width of the pole tips can be reduced.

Therefore, there is a strong felt need for a write head structure that can define a very narrow track width, with sufficiently strong field strength and with minimal side writing. Such a write head must be constructed by a method that allows proper alignment and symmetry between and within each of the pole tips.

SUMMARY OF THE INVENTION

The present invention provides a write head that produces a strong, narrow write field while preventing side writing. The write head includes a step notched first pole structure having a wider bottom portions that steps to a narrower top portion. The narrower top portion is self aligned with a second pole P2 structure formed opposite a write gap.

The write head may also include first and second winged portions extending laterally from the notches in the first pole. The winged portions can be recessed from the air bearing surface ABS by a desired amount, and act to draw stray side emitting magnetic fields back away from the ABS.

An ion mill resistant layer or bump such as an alumina bump may be formed over the winged portion of the first pole structure to aid in forming the winged structure during the various milling processes used to form the notch.

The first pole structure of the present invention advantageously provides a self aligned pole structure that avoids side writing (adjacent track writing) by moving the base of the notch away from the write gap where it might otherwise attract magnetic fields.

The stair notched structure provides an efficient means for ensuring sufficient magnetic material is available in the notched region to prevent saturation of the pole tips which would otherwise choke of flux and limit the available write field.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIGS. 6A-12B are views of a write head according to an embodiment of the invention, shown in various intermediate stages of manufacture.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
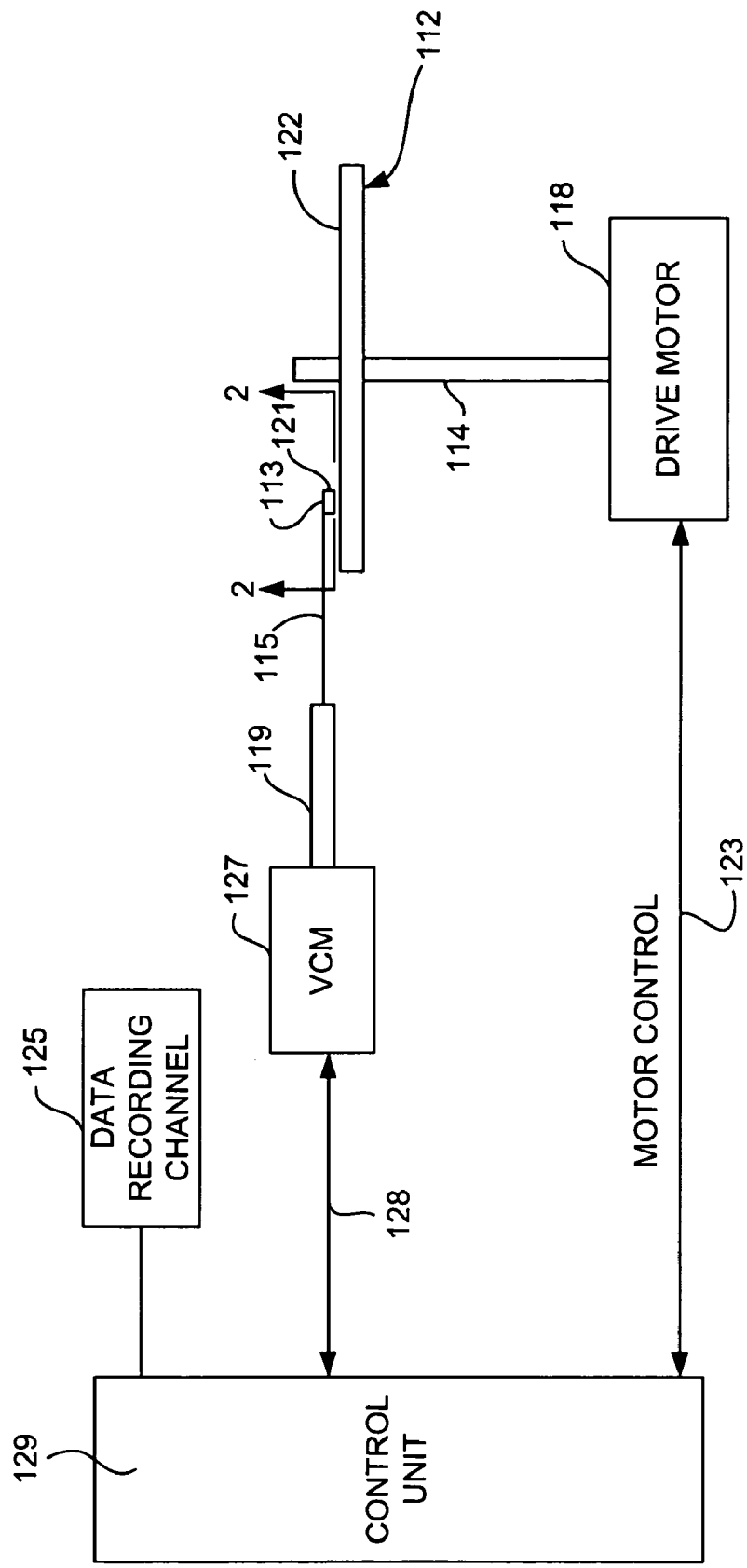
FIG. 1 is a schematic illustration of a disk drive system in which the invention might be embodied.

Referring now to FIG. 1, there is shown a disk drive 100 embodying this invention. As shown in FIG.1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
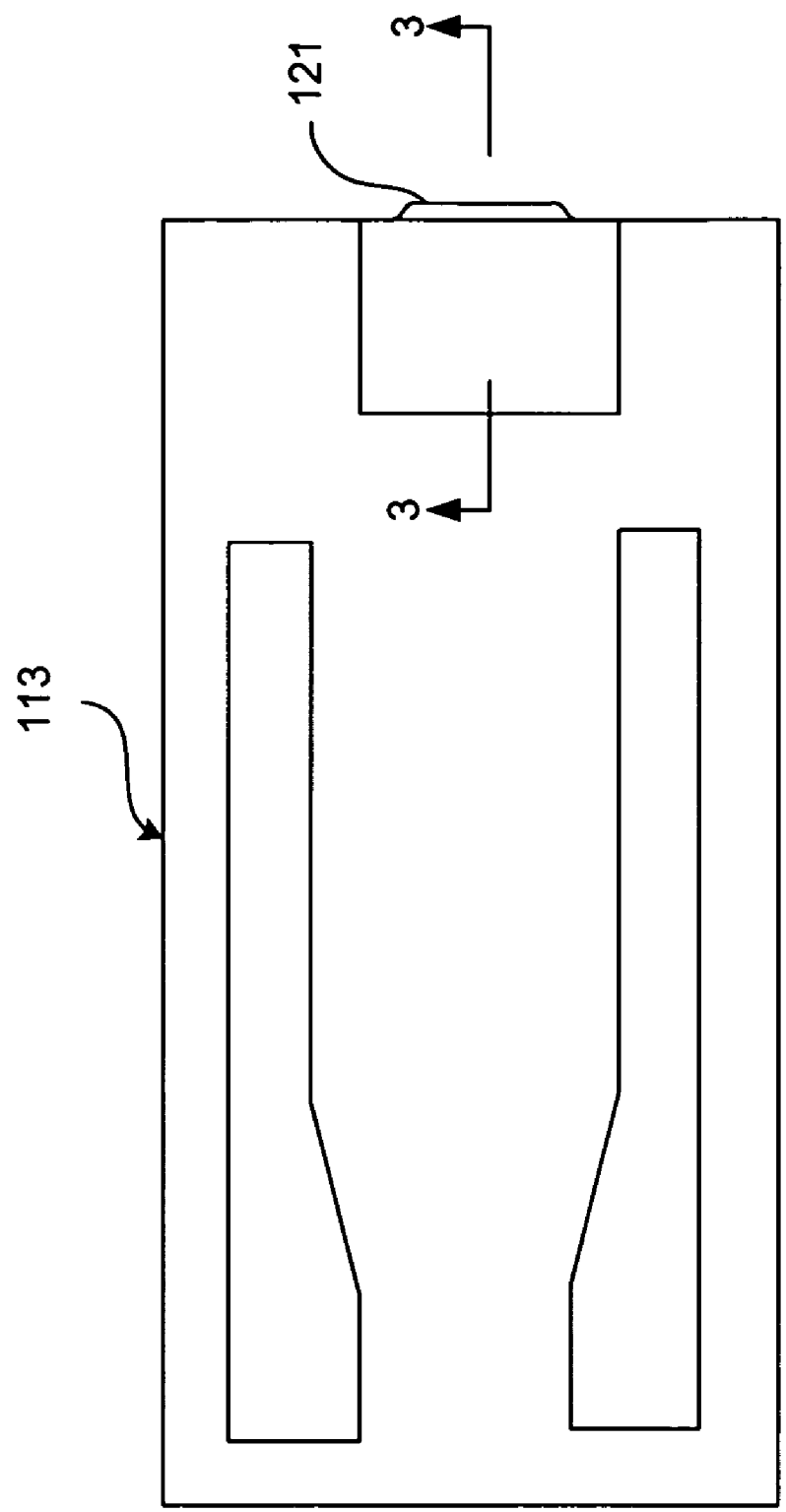
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
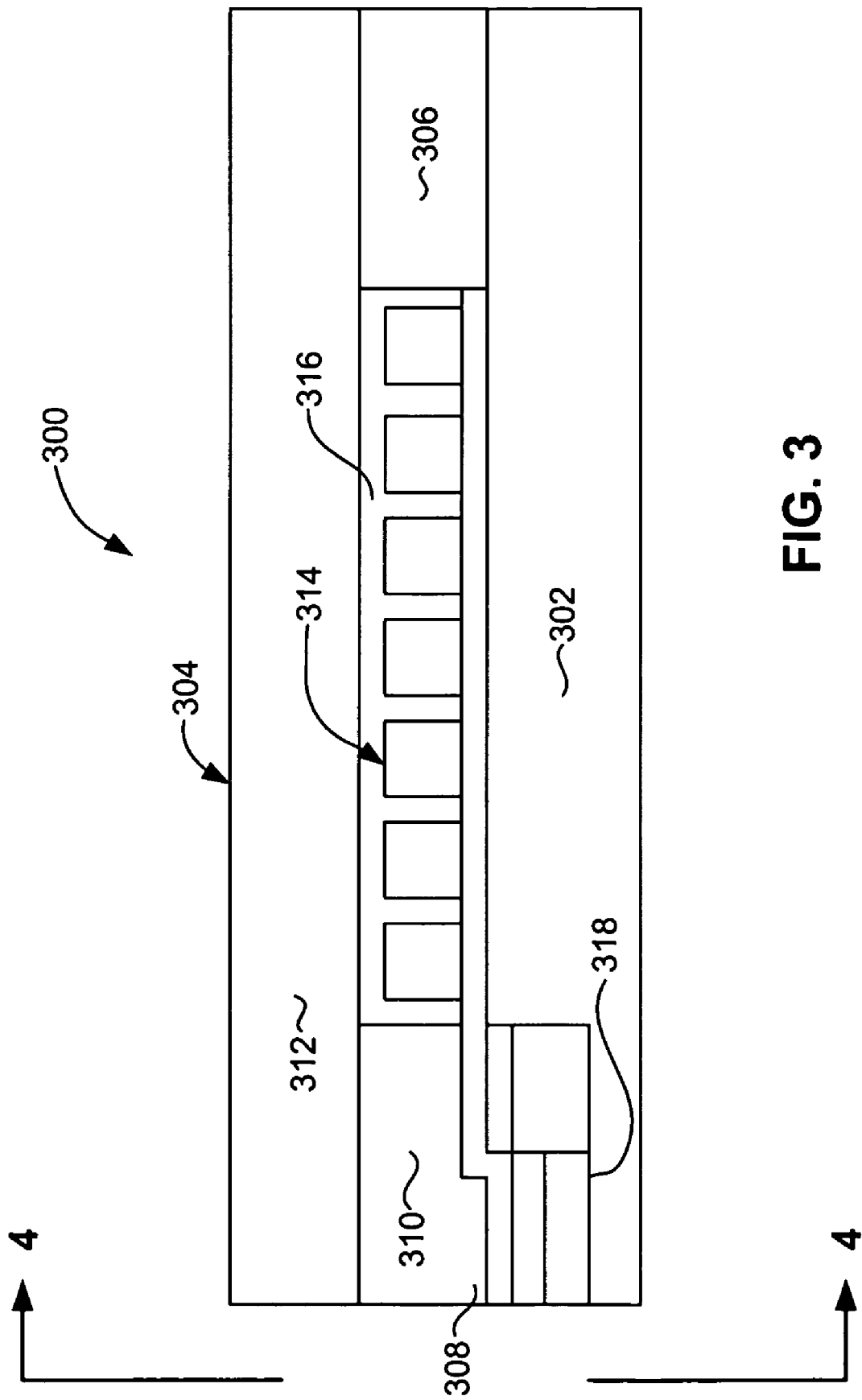
FIG. 3; is cross sectional view of a write head according to a possible embodiment of the invention.

With reference now to FIG. 3, a magnetic write head 300 according to an embodiment of the invention includes a first magnetic pole (P1) 302, and a second magnetic pole 304 formed over the first pole 302. The first and second magnetic poles are constructed of one or more magnetic materials such as CoFe or NiFe. The first and second magnetic poles 302, 304 are magnetically connected to one another by a back gap structure 306, which can also be constructed of a magnetic material such as NiFe or CoFe, and are separated from one another at a pole tip region by a, non-magnetic write gap material layer 308.

The second pole 304 includes a pedestal portion (P2) 310, and a portion (P3) 312 that extends from the P2 portion 310 to the back gap 306. The P2 portion 310 is preferably constructed of a high Bsat material such as $Ni_{50}Fe_{50}$ or CoFe. P3 312, and the back gap 306 can be constructed of CoFe or NiFe. A non-magnetic, electrically conductive write coil 314 passes between the first and second poles 302, 304. The coil 314 is constructed of a non-magnetic, electrically conductive material, such as Cu, and when a current flows through the coil a magnetic field from the coil causes a magnetic flux in the poles 302, 304, resulting in a fringing field (write field) across the write gap 308 at the pole tips. The coil 314 is embedded in one or more layers of insulation 316, which can be, for example, alumina ($Al_2O_3$).

Figure 4:
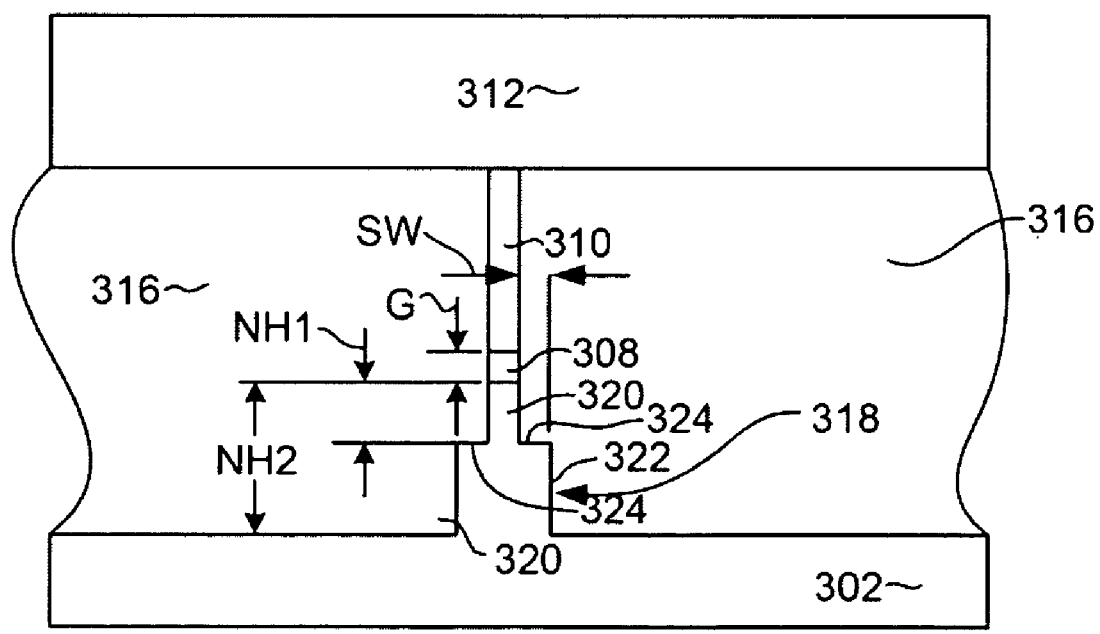
FIG. 4 is an ABS view, taken from line 4-4 of FIG. 3.

The first pole has a notched portion 318 which can be seen more clearly with reference to FIG. 4. As can be seen in FIG. 4, P2 310 is preferably very narrow. The notched portion 318 of the first pole has a stepped configuration having a narrow top portion 320 that has the same width as and is self aligned with the P2 pedestal portion 310. The notched portion 318 of the first pole 302 has a wider portion 322 with a step 324 forming the junction between the narrow portion and the wider portion 322.

According to the present invention, the P2 structure 310 is preferably constructed very narrow to achieve a desired narrow track width. A manufacturing method that will be described herein below, makes this narrow track width possible while also achieving self alignment of the P2 structure 310 with the first notched portion 318 of the first pole 302. The configuration of the notch 318 provides the head 300 with improved magnetic performance.

The step 320 prevents flux from leaking to the sides and keeps the flux more tightly confined with the write gap 308. Such flux leakage at the sides would lead to adjacent track interference. However, a certain amount of magnetic material is needed in the notched portion 318 of the first pole 302 to conduct flux to the narrow, vertical notched portion 324 to avoid magnetic saturation of the tip of the first pole 302 which would limit magnetic performance by reducing the available write field that the head 300 is capable of producing. By providing the notched portion 318 with a stepped structure leading to a wider bottom notched portion, the write head 300 can provide a narrow track width and avoid side writing while also preventing saturation of the pole 302 in the pole tip region.

With reference still to FIG. 4, the gap 308 has a gap thickness G as measured along a track length direction. The height of the narrow notch portion 320 defines a first notch height NH1 that is measured from the gap 308 to the step 324. Preferaby NH1 is 0.5 to 2 times the gap thickness G, or about equal to G. NH1. The distance from the gap 324 to the base of wider notch portion 322 defines a second notch height NH2 (total notch height). NH2 can be 1.5 to 3 times NH1. Each step can have a width (SW) as measured from the edge of the narrow portion 320 to the edge of the wider portion 322 that is about 0.01-0.03 times the gap thickness.

Figure 5:
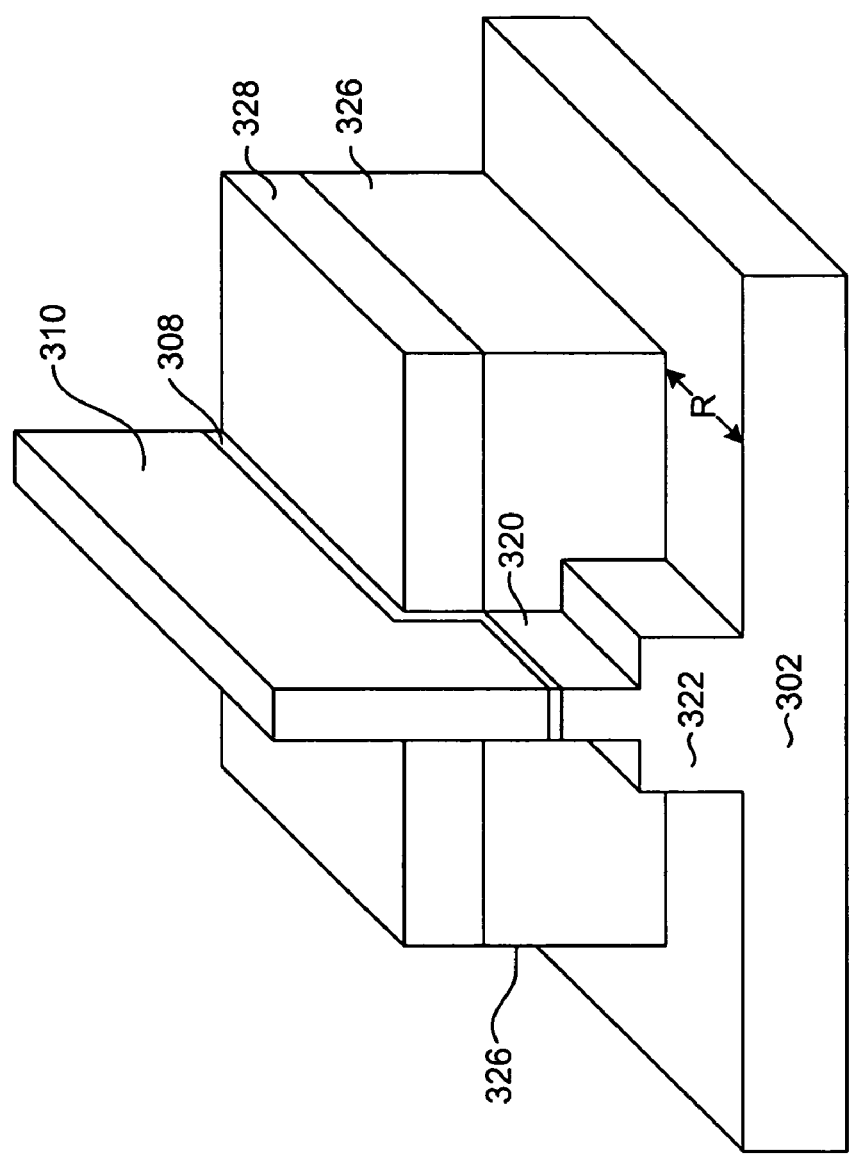
FIG. 5 is an isometric view of a portion of a write head according to an embodiment of the invention.

With reference to FIG. 5, which shows a perspective view of the write head 300, it can be seen that the first pole can be formed with laterally extending wing portions. These wing portions are optional, as the above described notch structure 318 can be used without the wings 326. These laterally extending wing portions, which are formed in the first pole structure improve magnetic performance of the write head by further preventing side writing. Should any magnetic field be emitted from the sides of the pole tips 320, 310 during writing, this field will be drawn back toward the wing portions away from the magnetic medium, thereby preventing side writing to the medium.

It should also be pointed out that P2 structure 310 does not flair out, but remains narrow beyond the location of the laterally extending wing portions 326. We have found this configuration to provide optimal magnetic performance in avoiding side writing and providing a strong narrow magnetic field. A layer or bump 328, constructed of a material that is resistant to ion milling, is provided over the wing portion 326, and is useful in the manufacture of the wing portions 326. This will be better understood upon reading the following description of a possible method for constructing a write head according to an embodiment of the invention. The bump 328 may be constructed of alumina ($Al_2O_3$), but could be constructed of some other material, and will hereinafter be referred to as an alumina bump 328.

Figure 6A:
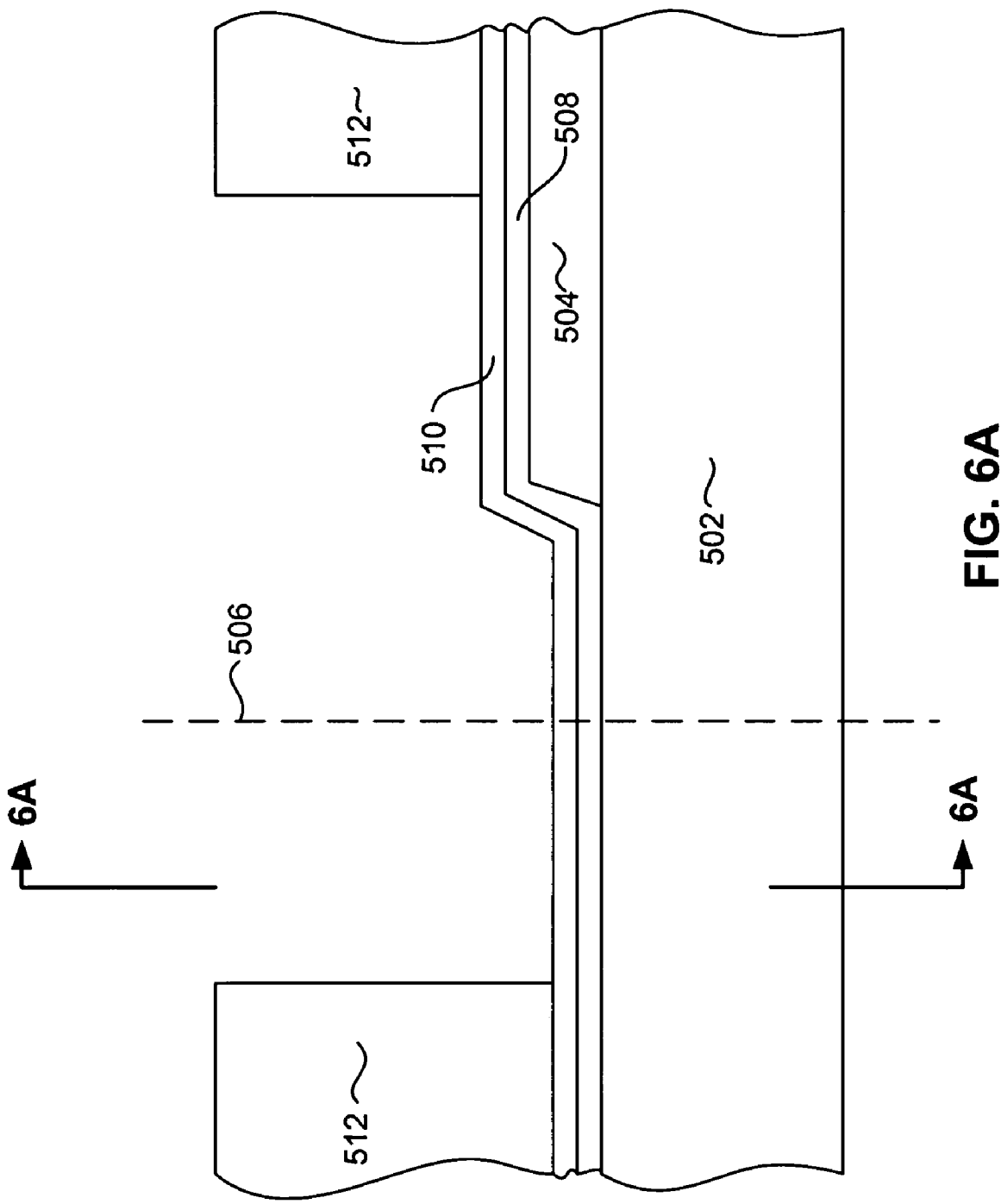

FIGS. 6A-12B, illustrate a method for constructing a write element 302 according to an embodiment of the invention. With particular reference to FIG. 6A and 6B, a first magnetic layer (first pole) 502 is formed. An alumina bump 504 (or other ion mill resistant material) is formed over the first pole layer. The alumina bump 504 is spaced a distance R from an intended air bearing surface (ABS) plane 506. Although the ABS does not actually exist at this point in the manufacturing process, it will later be formed by lapping to remove material to form an ABS plane at a location indicated by dashed line 506.

Figure 6B:
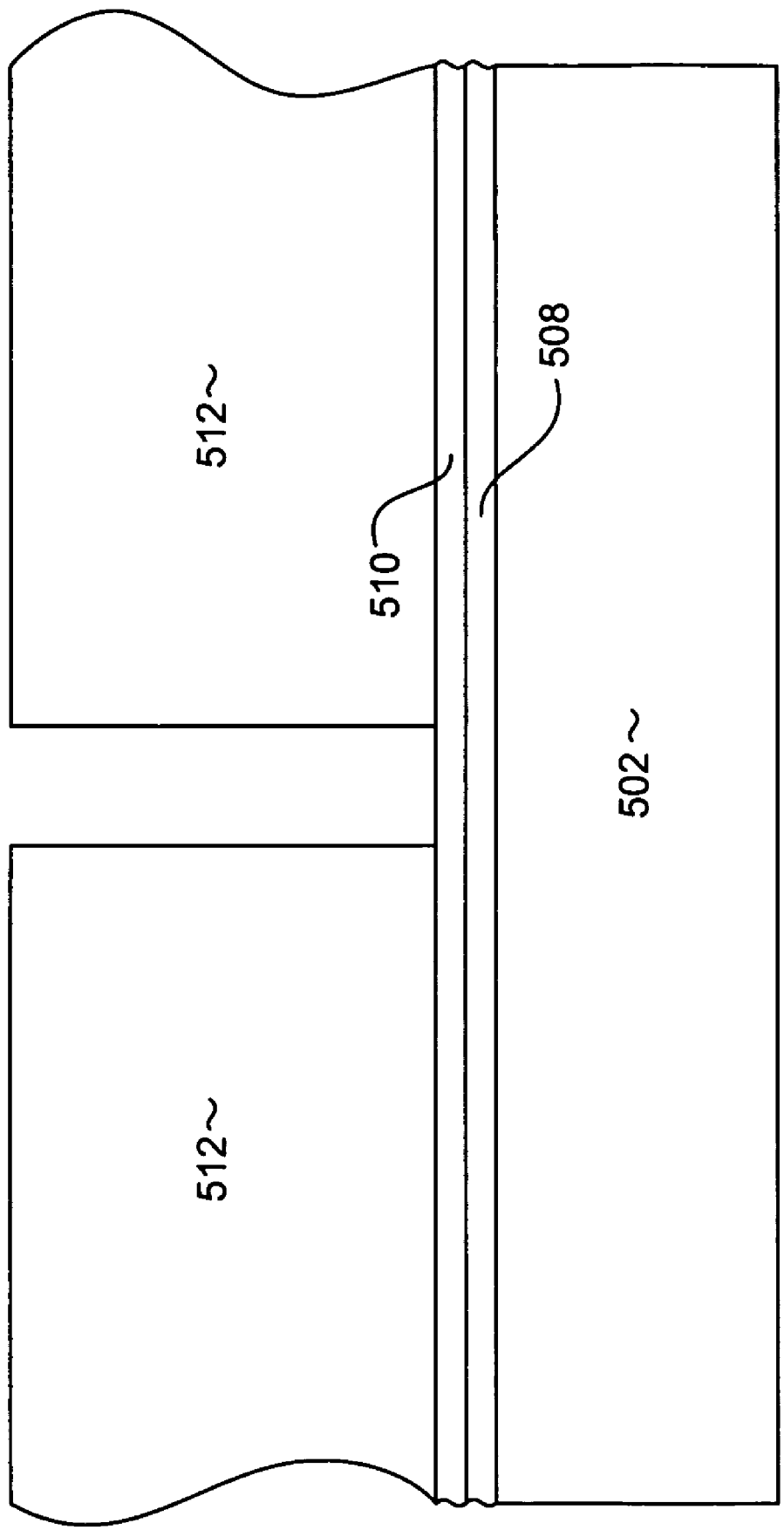

With continued reference to FIGS. 6A and 6B, a layer or non-magnetic, electrically conducive write gap material 508 is deposited. The write gap 508 can be constructed of several materials, such as for example alumina. An optional seed layer 510 may be deposited over the write gap layer 508. The seed layer 510 may be an electrically conductive material such as a metal that can be deposited by sputtering in order to provide an electrically conductive surface on which to perform electroplating. If an electrically conductive material is used for the write gap 508 (such as in a "metal in gap" design), then the seed layer 510 may not be necessary. A mask 512, such as a photoresist frame can then be formed with an opening configured to define the P2 structure 310 (FIG. 3-5).

Figure 7:
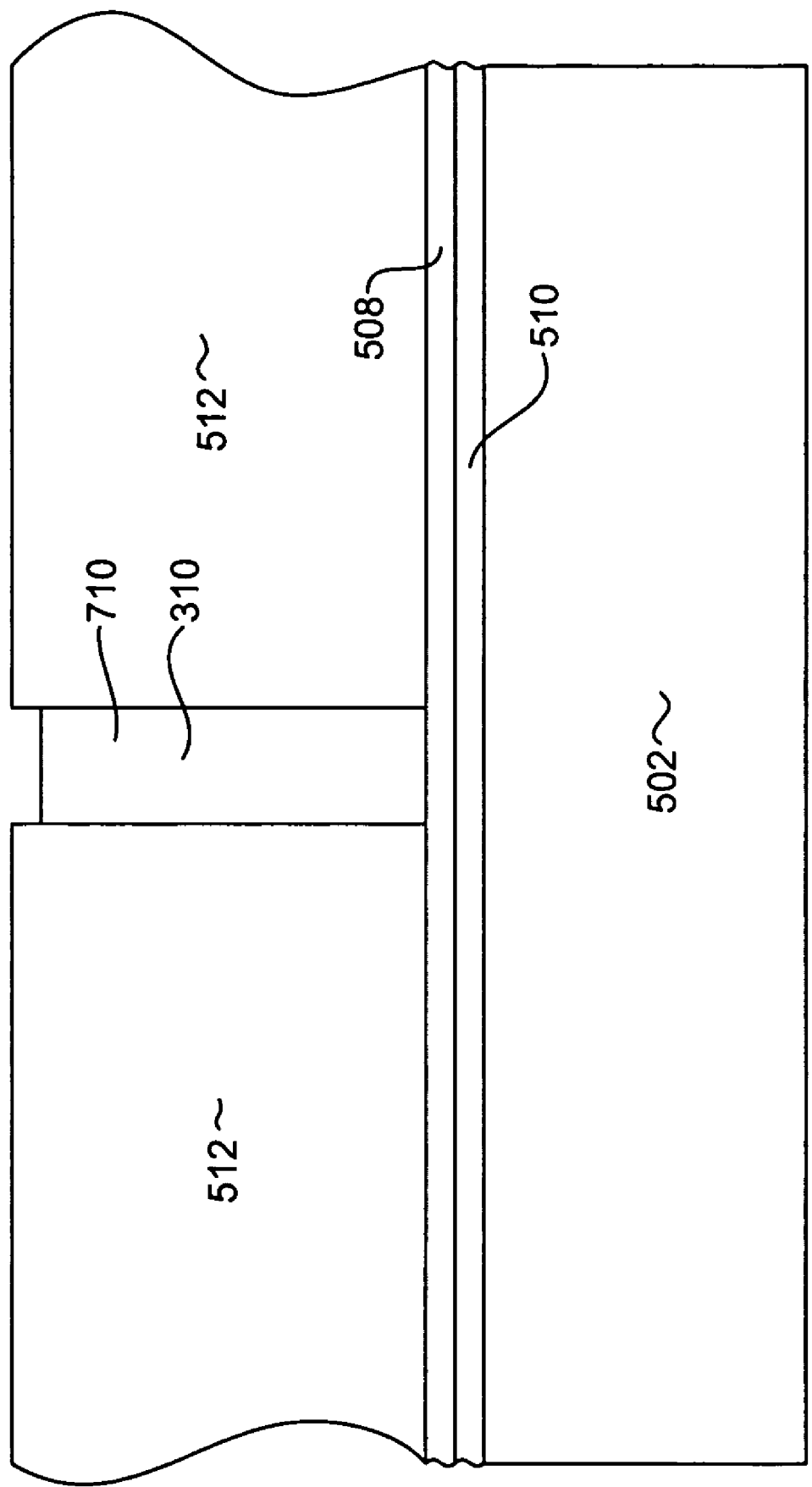
Figure 8:
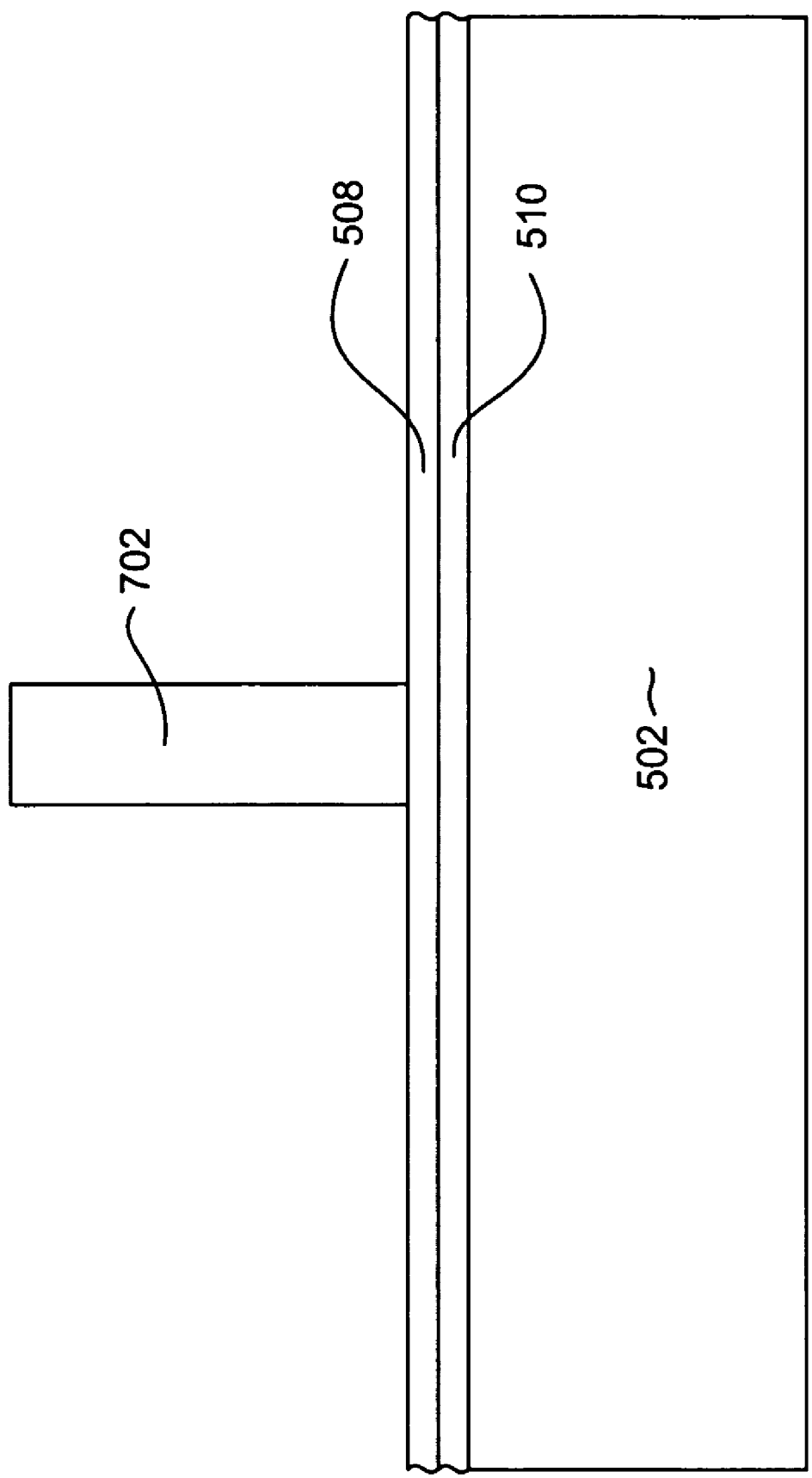
Figure 9:
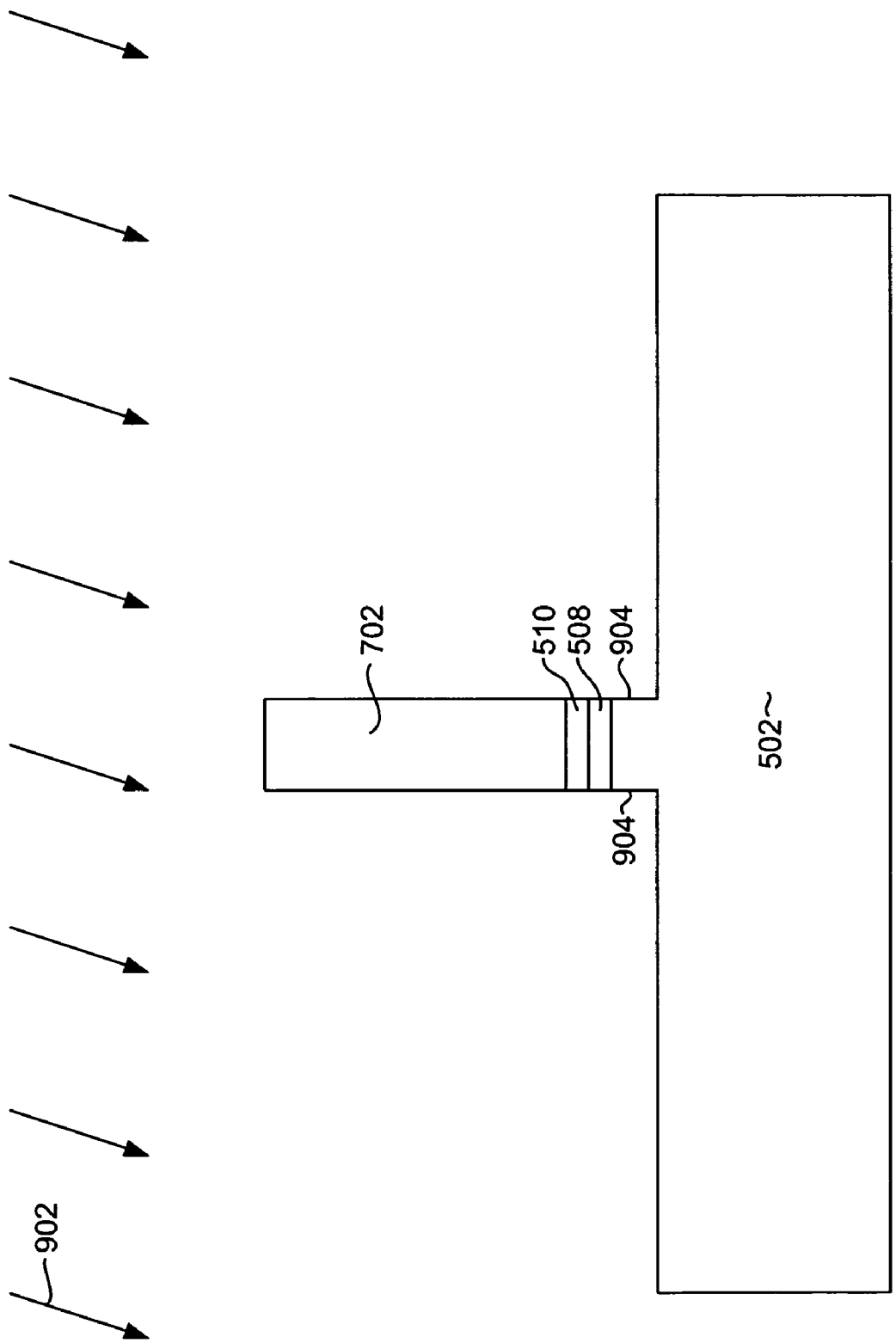

With reference now to FIG. 7, a magnetic material 702 can be deposited such as by electroplating. The magnetic material 702 is preferably a high Bsat material such as CoFe or $Ni_{50}Fe_{50}$, and will form the P2 structure 310 illustrated in FIGS. 3-5. With reference now to FIG. 8, the photoresist frame 512 can be removed leaving the magnetic P2 material 702. With reference to FIG. 9, a material removal process 902 such as ion milling can be performed to remove portions of the seed layer 510, gap layer 508 and first pole layer 502 using the P2 magnetic layer 702 as a mask to form a first notch 904.

Figure 10:
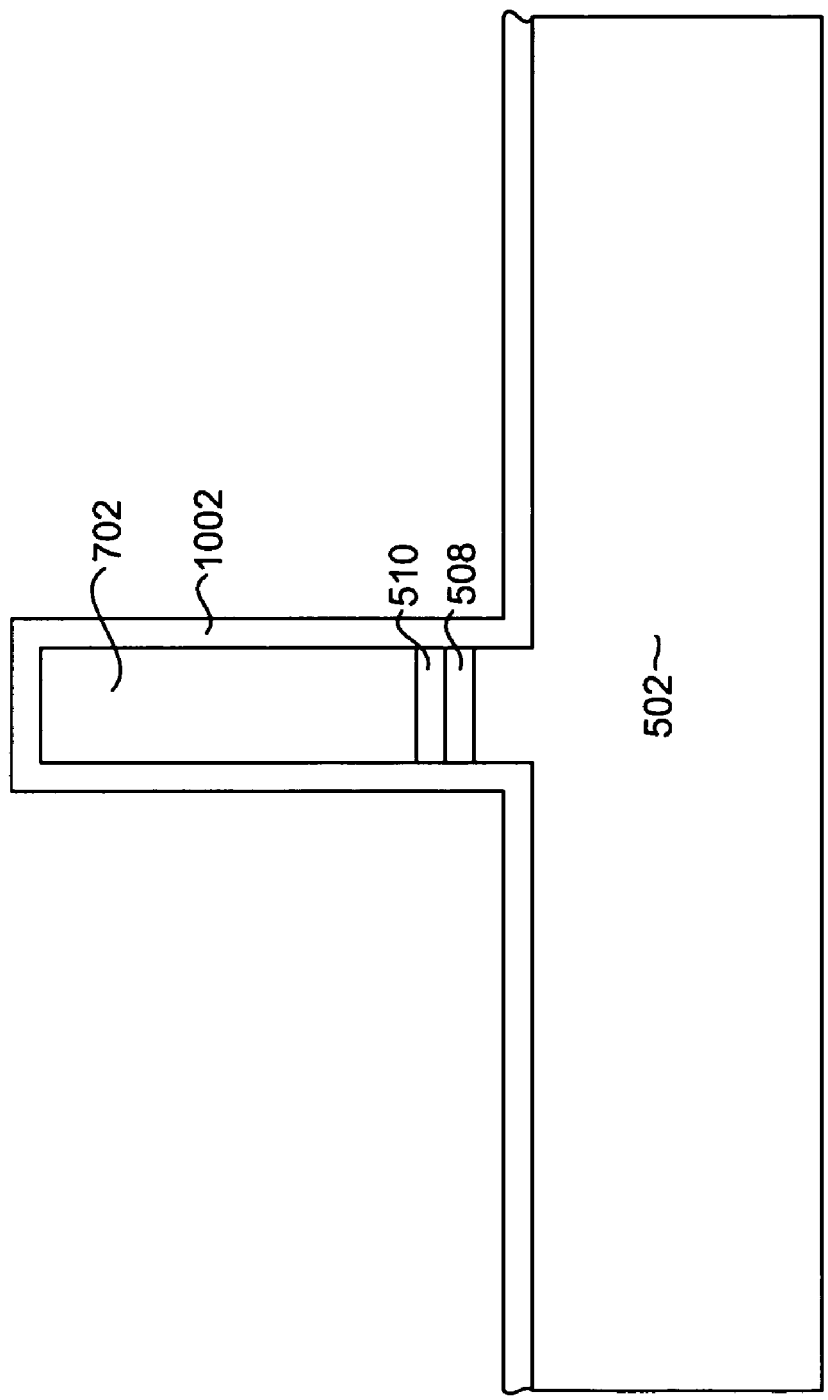

With reference to FIG. 10, a layer of non-magnetic material 1002 such as alumina is conformally deposited. The conformal deposition of the non-magnetic layer can be for example by ion beam sputtering, atomic layer deposition (ALD), RF sputtering, chemical vapor deposition (CVD) or some other technique. The non-magnetic layer 1002 is preferably deposited to a thickness of about 1-3 times the thickness of the gap material 508.

With reference now to FIG. 11, a second material removal process 1102 such as an Argon notching ion mill is performed to remove horizontally disposed portions of the non-magnetic material 1002. The second material removal process is a directional process that preferentially removes horizontally disposed material. In this way, the process 1102 can remove the non-magnetic material from the top of the P2 layer 702 and from the surface of the first pole layer 502 while leaving non-magnetic material 1002 on the sides of the P2 layer 702 and on the sides of the first notch 904.

Figure 12A:
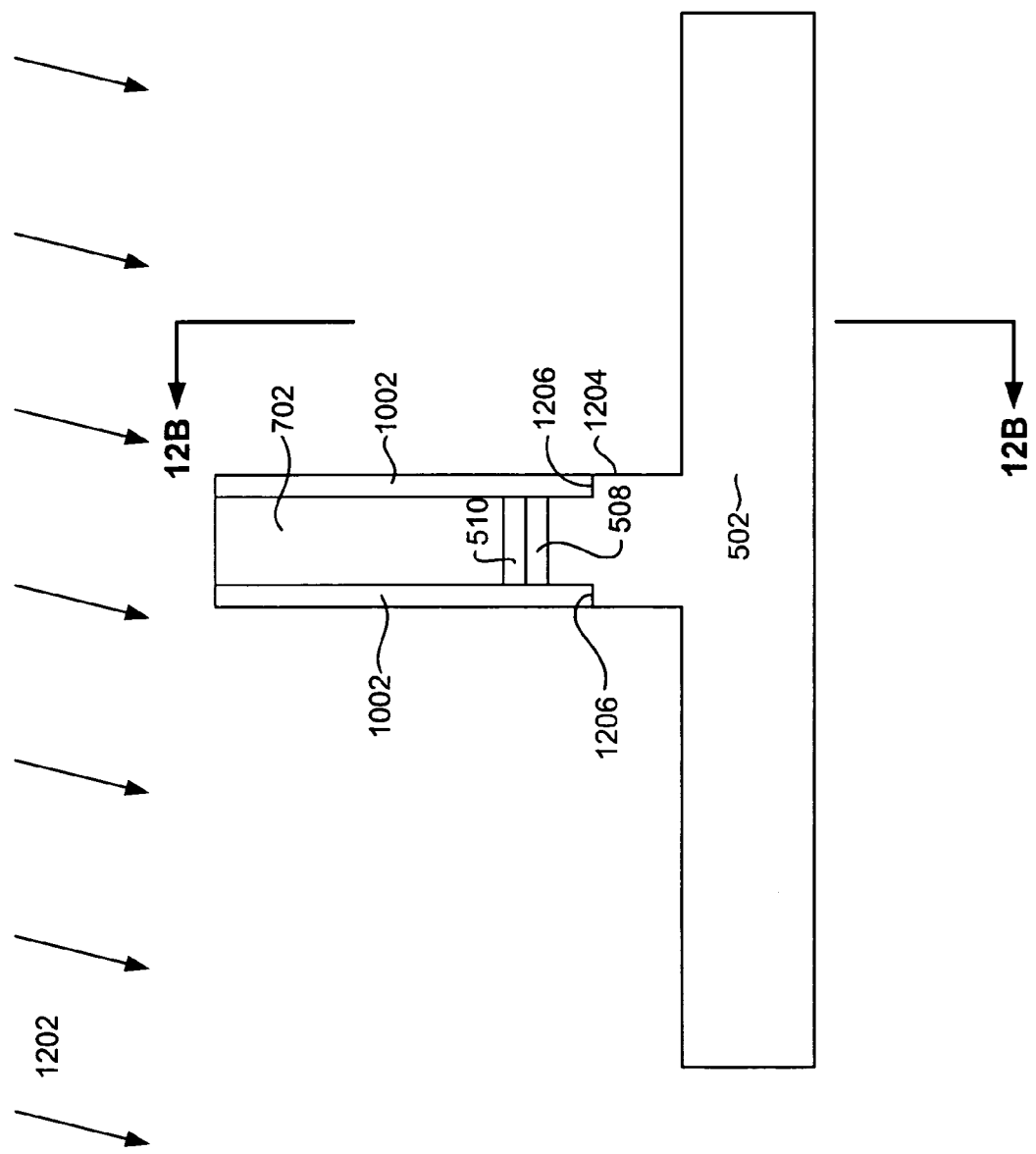
Figure 12B:
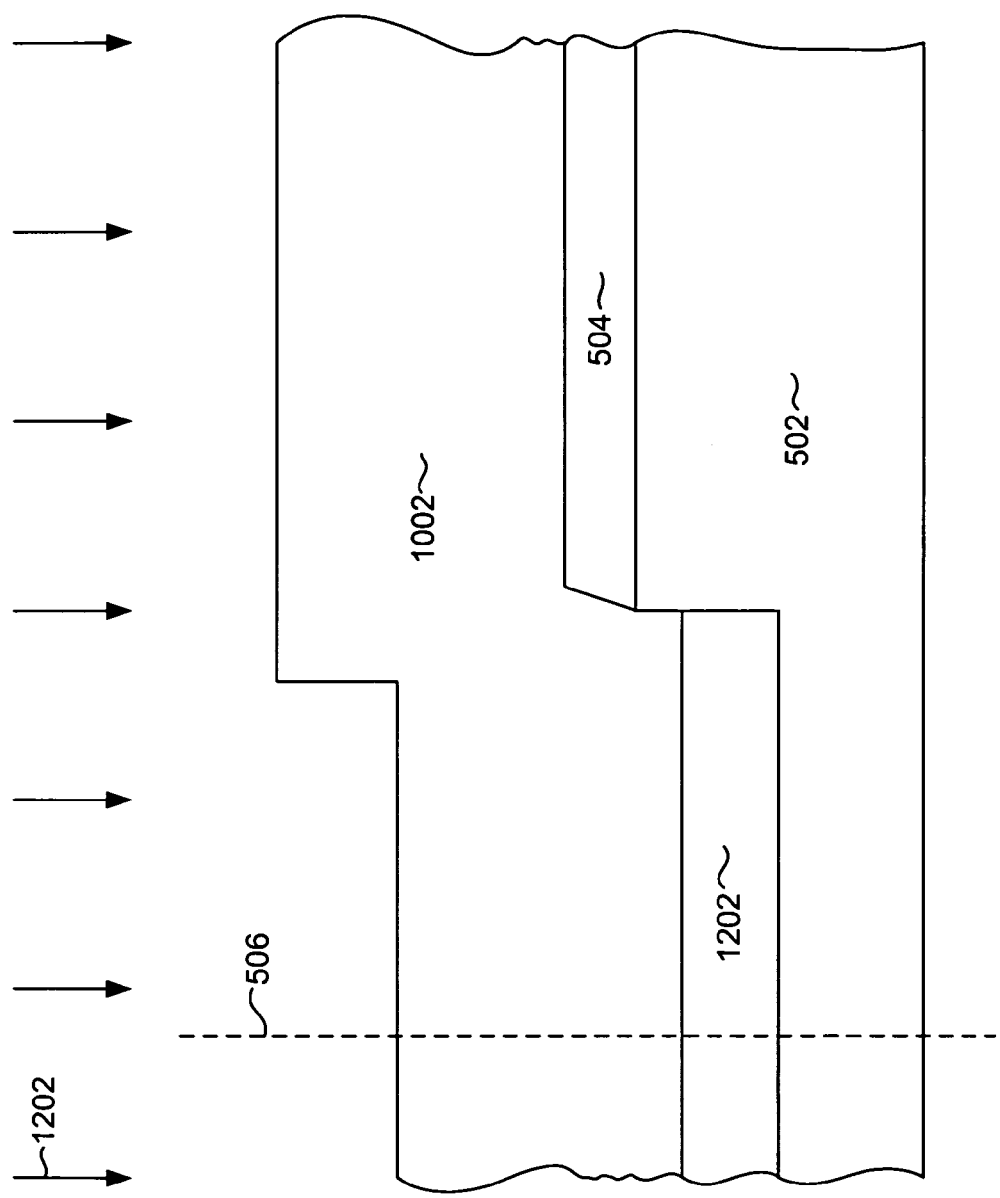

With reference now to FIGS. 12A and 12B, a third material removal process 1202, such as ion milling is performed to remove portions of the first pole material that are not protected by the remaining ion mill resistant material layer 1002 and P2 702 to form a second notch 1204. Using the remaining ion mill resistant material as a mask during this third material removal process forms a desired step at the junction between the first notch 1206 and second notch 1204. In this way the first pole 502 can be formed with a stepped notch structure having a wider base 322 that steps to the narrower notched upper portion 320 as described earlier with reference to FIGS. 3-5. FIG. 12B shows that the first pole material 502 that is located under the alumina bump 504 is protected from and not removed by the first, second and third material removal processes 902, 1002, 1102. This masking provided by the alumina bump forms the laterally extending portions 326 described with reference to FIGS. 3-5.

The above described process forms a desired P2 structure 502 having a stepped notch structure 318 described with reference to FIGS. 305. The process also forms the advantageous laterally extending wing portions 326. With the first pole 502, write gap 508 and P2 structure 310 formed, the other structures, such as the write coil 314 insulation 316, and P3 312 can be constructed by methods that will be familiar to those skilled in the art. These methods may include the photolithographic formation of photoresist frames and plating of electrically conductive material for the coil and magnetic material for the P3 structure 312. The back gap 306 may be formed simultaneously with the P2 structure 310 or at some other manufacturing stage.

The use of the bump 1208, makes it possible to construct the first pole 1202 to have the laterally extending wings, while the second pole structure 1212 can be constructed with a narrow width that extends beyond the location of the wings 1204. Our modeling has shown that this structure provides improved magnetic performance by minimizing side writing. As the magnetic write field extends across the write gap 1210 a certain amount of this field may extend out the sides as a side leaking field. The laterally extending wing portions 1204 draw this side leaking flux back away from the ABS and away from the adjacent magnetic medium, thereby preventing side writing.

The wing portions 1204 are preferably recessed from the ABS. The wing portions 1204 can be recessed from the ABS a distance R that is 0.5-5 times the gap G. Our modeling has shown that this configuration, with a first pole having wing portions and a second narrow pole that remains narrow past the location of the wings, provides optimal magnetic performance.

It should be pointed out that while the above step notched pole structure has been described as having a single step, multiple steps could also be employed. It is believed however that as the number of steps increases, the advantage of additional steps diminishes while the cost and complexity of manufacture increases. Therefore, a single step as described above is believed to bet the best embodiment presently contemplated.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head comprising for use in magnetic data
   recording, the write head comprising:
   a first magnetic pole structure (P1);
   a second magnetic pole structure (P2) having first and second sides that define a track width; and
   a non-magnetic write gap material sandwiched between P1 and P2; and
   wherein P1 is configured with a first notched portion, a second notched portion and first and second steps at junction between the first and second notched portions, the first notched portion having a width defined by third and fourth sides that are aligned with the first and second sides of the P2, the second notched portion having a width that is defined by fifth and sixth sides, the width of the second notched portion being larger than the first notched portion;
   wherein P1 and P2 are separate by a distance that defines a gap (G) and wherein
   the step has a lateral width equal to 0.1-0.03 times G.

2. A write head as in claim 1 wherein the first, second, third, fourth, fifth and sixth sides are substantially vertical.

3. A write head as in claim 1, wherein the first notch portion is disposed between the second notch portion and the non-magnetic write gap material.

4. A write head as in claim 1 wherein distance between P2 and P1 defines a gap (G) and wherein the distance from the write gap material to at least one of the first and second steps is 0.5-1.5 times G.

5. A write head as in claim 1 wherein distance between P2 and P1 defines a gap (G) and wherein the distance from the write gap material to at least one of the first and second steps is substantially equal to G.

6. A write head as in claim 1 further comprising:
   a first and second wing portions formed in P1 extending laterally from the first and second notched portions, the first and second winged portions each having a front edge that is recessed from an air bearing surface (ABS) of the write head by a distance R; and
   a layer of ion mill resistant material formed over the first and second wing portions between P1 and the write gap layer.

7. A magnetic write head comprising for use in magnetic data recording, the write head comprising:
   a first magnetic pole structure (P1);
   a second magnetic Dole structure (P2) having first and second sides that define a track width; and
   a non-magnetic write gap material sandwiched between P1 and P2; and
   wherein P1 is configured with a first notched portion, a second notched portion and first and second steps at junction between the first and second notched portions, the first notched portion having a width defined by third and fourth sides that are aligned with the first and second sides of the P2, the second notched portion having a width that is defined by fifth and sixth sides, the width of the second notched portion being lamer than the first notched portion;
   wherein R is 0.5-5 times the gap thickness G.

8. A magnetic write head comprising for use in magnetic data recording. the write head comprising:
   a first magnetic pole structure (P1);
   a second magnetic pole structure (P2) having first and second sides that define a track width; and
   a non-magnetic write gap material sandwiched between P1 and P2; and
   wherein P1 is configured with a first notched portion, a second notched portion and first and second steps at junction between the first and second notched portions, the first notched portion having a width defined by third and fourth sides that are aligned with the first and second sides of the P2, the second notched portion having a width that is defined by fifth and sixth sides, the width of the second notched portion being larger than the first notched portion;
   wherein the write head has an air bearing surface (ABS) and wherein the first and second wing portions each have a front edge that is recessed from the ABS by a distance R and wherein P2 has a substantially constant width (TW) that extends from the ABS a distance greater than R.

* * * * *

UNITED STATES PATENT AND TRADEMARK OFFICE
CERTIFICATE OF CORRECTION

| | |
|---|---|
| PATENT NO. | : 7,551,397 B2 |
| APPLICATION NO. | : 11/218701 |
| DATED | : June 23, 2009 |
| INVENTOR(S) | : Cao et al. |

Page 1 of 1

It is certified that error appears in the above-identified patent and that said Letters Patent is hereby corrected as shown below:

In claim 7, column 8, line 21, please replace "Dole" with --pole--

Signed and Sealed this

Eighth Day of June, 2010

David J. Kappos
*Director of the United States Patent and Trademark Office*